US011657360B2

(12) United States Patent
Lim

(10) Patent No.: US 11,657,360 B2
(45) Date of Patent: May 23, 2023

(54) FLOATING FACTORY, OPERATING METHOD OF MANUFACTURING SERVICE DEVICE, AND INTEGRATED PRODUCT MANAGEMENT SYSTEM INCLUDING FLOATING FACTORY AND MANUFACTURING SERVICE DEVICE

(71) Applicant: Samsung Electronics Co., Ltd., Suwon-si (KR)

(72) Inventor: Joon-Sung Lim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 544 days.

(21) Appl. No.: 16/782,444

(22) Filed: Feb. 5, 2020

(65) Prior Publication Data
US 2020/0311667 A1 Oct. 1, 2020

(30) Foreign Application Priority Data

Mar. 27, 2019 (KR) .................. 10-2019-0035326

(51) Int. Cl.
*G06Q 10/08* (2023.01)
*G06Q 10/0832* (2023.01)
(Continued)

(52) U.S. Cl.
CPC ......... *G06Q 10/0832* (2013.01); *G06Q 10/04* (2013.01); *G06Q 10/06311* (2013.01);
(Continued)

(58) Field of Classification Search
CPC ............... G06Q 10/0832; G06Q 10/04; G06Q 10/06311; G06Q 10/06312; G06Q 10/06315; G06Q 10/06316
See application file for complete search history.

(56) References Cited

U.S. PATENT DOCUMENTS

| 4,568,522 A | * | 2/1986 | Corbett | ..................... | C01D 7/07 |
| | | | | | 422/186 |
| 6,420,877 B1 | * | 7/2002 | Replogle | ................ | G01R 31/52 |
| | | | | | 324/525 |
| 7,945,472 B2 | | 5/2011 | Pappas et al. | | |
| 9,887,199 B2 | | 2/2018 | Lim et al. | | |
| 10,310,499 B1 | * | 6/2019 | Brady | .................. | G05D 1/0278 |

(Continued)

FOREIGN PATENT DOCUMENTS

| JP | H07200678 A | 8/1995 |
| JP | H11306233 A | 11/1999 |

(Continued)

OTHER PUBLICATIONS

Paredes Belmar, German Enrique, Vehicle Routing Problems with Product Mixing and Extensions, Pontificia Universidad Catolica de Chile, 2016.*

*Primary Examiner* — Nathan Erb
(74) *Attorney, Agent, or Firm* — Harness, Dickey & Pierce, P.L.C.

(57) ABSTRACT

An operating method of a manufacturing service device for managing a floating factory including obtaining demand information on an electronic product at a demand location, calculating cost information of at least one floating factory of a plurality of floating factories based on the demand information and status information of each of the floating factories, selecting a floating factory from the plurality of floating factories corresponding to the calculated cost information indicating a lowest cost, generating movement scheduling information of the selected floating factory based on the demand location and manufacturing locations of components of the electronic product, transmitting the movement scheduling information to the selected floating factory, configuring the selected floating factory to manufacture the electronic product and test the electronic product (Continued)

for defects based on the movement scheduling information, while moving to the demand location may be provided, and supplying the electronic product that has passed the test at the demand location.

17 Claims, 9 Drawing Sheets

(51) Int. Cl.
*G06Q 10/04* (2023.01)
*G06Q 10/0631* (2023.01)

(52) U.S. Cl.
CPC .............. *G06Q 10/06312* (2013.01); *G06Q 10/06315* (2013.01); *G06Q 10/06316* (2013.01)

(56) References Cited

U.S. PATENT DOCUMENTS

| | | | |
|---|---|---|---|
| 2003/0149503 | A1 | 8/2003 | Kawase et al. |
| 2018/0197137 | A1* | 7/2018 | High .................. G06Q 30/0202 |
| 2018/0265296 | A1* | 9/2018 | Beckman ................ B61L 27/14 |
| 2019/0072932 | A1* | 3/2019 | Sitnikov ............... B29C 64/147 |

FOREIGN PATENT DOCUMENTS

| | | |
|---|---|---|
| JP | 2003228410 A | 8/2003 |
| JP | 2008130069 A | 6/2008 |
| JP | 2017047718 A | 3/2017 |
| KR | 20160137186 A | 11/2016 |
| KR | 101692777 B1 | 1/2017 |
| KR | 20170116430 A | 10/2017 |
| KR | 101825881 B1 | 2/2018 |
| KR | 101853943 B1 | 5/2018 |
| KR | 20180101815 A | 9/2018 |

* cited by examiner

FLOATING FACTORY, OPERATING METHOD OF MANUFACTURING SERVICE DEVICE, AND INTEGRATED PRODUCT MANAGEMENT SYSTEM INCLUDING FLOATING FACTORY AND MANUFACTURING SERVICE DEVICE

CROSS-REFERENCE TO RELATED APPLICATIONS

This application claims priority under 35 U.S.C. § 119 to Korean Patent Application No. 10-2019-0035326 filed on Mar. 27, 2019, in the Korean Intellectual Property Office, the disclosure of which is incorporated by reference herein in its entirety.

BACKGROUND

Example embodiments of the inventive concepts described herein relate to product manufacturing systems, and more particularly, relate to floating factories, operating methods of a manufacturing service device managing the floating factory, and/or integrated product management systems including the floating factory and the manufacturing service device.

Demand on electronic products such as home appliances and semiconductor devices is globally increasing. An electronic product and components constituting the electronic product are being manufactured at various locations of the world in consideration of personal expenses, demand locations, etc. Because it is difficult for one company to manufacture all components of an electronic product, the company may collect components manufactured by various companies and/or at various locations for the purpose of manufacturing an electronic product. Further, the electronic product manufactured with the collected components may need to be delivered to a destination.

As such, in the case where the collection of components, the manufacturing of products, and the transportation of products are individually made, there is a problem in the supply of the electronic product. For example, in the case where there is a problem in one of the collection of components, the manufacturing of products, and the transportation of products, the supply of the electronic product may be delayed. In particular, in the case where products are not quickly supplied to a market where the demand for the electronic product changes suddenly, the sale of the electronic product may decrease. Thus, integrated management for the collection of components, the manufacturing of products, and the transportation of products is being desired.

SUMMARY

Some example embodiments of the inventive concepts provide a floating factory for integrally managing the manufacture and supply of an electronic product, an operating method of a manufacturing service device managing the floating factory, and an integrated product management system including the floating factory and the manufacturing service device.

According to an example embodiment, an operating method of a manufacturing service device for managing a floating factory includes obtaining demand information on an electronic product at a demand location, calculating cost information of at least one floating factory of a plurality of floating factories based on the demand information and status information of each of the plurality of floating factories, selecting a floating factory from the plurality of floating factories corresponding to the calculated cost information indicating a lowest cost, generating movement scheduling information of the selected floating factory based on the demand location and manufacturing locations of components of the electronic product, transmitting the movement scheduling information to the selected floating factory, configuring the selected floating factory to manufacture the electronic product and test the electronic product for defects based on the movement scheduling information, while moving to the demand location, and supplying the electronic product that has passed the test at the demand location.

According to an example embodiment, an integrated product management system includes a manufacturing service device configured to generate movement scheduling information based on a demand location of an electronic product and manufacturing locations of components of the electronic product, and a floating factory configured to move to the manufacturing locations of the components of the electronic product based on the movement scheduling information to collect the components of the electronic product, and assemble the collected components to manufacture the electronic product, while moving to the demand location.

According to an example embodiment, a floating factory includes at least one memory configured to store computer-readable instructions, and one or more processors configured to execute the computer-readable instructions such that the one or more processors are configured to obtain demand information of a demand location for an electronic product, generate movement scheduling information based on manufacturing locations of components of the electronic product and the demand location, cause the floating factory to move to the manufacturing locations of the components of the electronic product and to the demand location based on the movement scheduling information, and assemble the components collected from the manufacturing locations to manufacture the electronic product, while moving to the demand location.

BRIEF DESCRIPTION OF THE FIGURES

The above and other objects and features of the inventive concepts will become apparent by describing in detail some example embodiments thereof with reference to the accompanying drawings.

DETAILED DESCRIPTION

Below, example embodiments of the inventive concepts may be described in detail and clearly to such an extent that an ordinary one in the art easily implements the inventive concepts.

Figure 1:
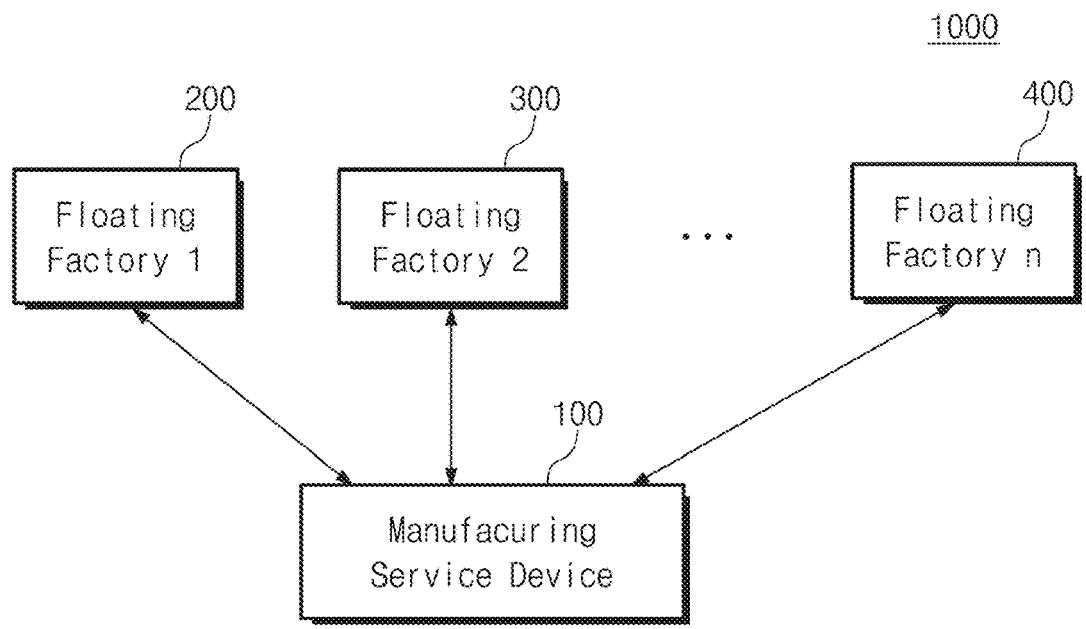
FIG. 1 is a block diagram illustrating an integrated product management system according to an example embodiment of the inventive concepts.

FIG. 1 is a block diagram illustrating an integrated product management system according to an example embodiment of the inventive concepts. Referring to FIG. 1, an integrated product management system 1000 may integrally manage electronic products for the purpose of the sale of various kinds of electronic products. For example, the integrated product management system 1000 may manage the collection of components constituting an electronic product, manufacture or production of the electronic product using the collected components, and transportation of the electronic product. Here, the electronic product may include a mobile phone, home appliances such as a television (TV) and an air conditioner, and semiconductor devices such as a memory device, a memory controller, and a processor. However, the inventive concepts are not limited thereto. An electronic product according to example embodiments of the inventive concepts may include any products (e.g., a secondary battery or a vehicle) that could be manufactured through an assembly process.

The integrated product management system 1000 may include a manufacturing service device 100 and a plurality of floating factories 200 to 400. The floating factories 200 to 400 may be a mobile manufacturing factory capable of manufacturing an electronic product while moving from one location to another location. For example, the floating factories 200 to 400 may collect components of an electronic product from various locations while moving between locations. Further, the floating factories 200 to 400 may manufacture an electronic product by assembling the collected components while moving between locations. As such, the transportation and manufacture of the electronic product may be simultaneously performed. In other words, the electronic product may be manufactured while corresponding ones of the floating factories 200 to 400 are on the move. For example, each of the floating factories 200 to 400 may be implemented with a ship (or vessel). However, the inventive concepts are not limited thereto. For example, each of the floating factories 200 to 400 may be implemented with any type of means of transportation that is capable of being equipped with facilities for assembling components and is capable of moving to various locations.

Below, for convenience of description, it is assumed that each of the floating factories 200 to 400 is implemented with a ship.

Each of the floating factories 200 to 400 may include assembly facilities capable of manufacturing one or more electronic products. For example, the first floating factory 200 may include assembly facilities capable of manufacturing a solid state drive (SSD), and the second floating factory 300 may include assembly facilities capable of manufacturing a memory controller. In some example embodiments, the first floating factory 200 may include assembly facilities capable of manufacturing the SSD and the TV.

The floating factories 200 to 400 may include the same assembly facilities or may include different assembly facilities. For example, the first floating factory 200 and the second floating factory 300 may include assembly facilities capable of manufacturing the SSD, and the n-th floating factory 400 may include assembly facilities capable of manufacturing a mobile phone.

The manufacturing service device 100 may generate movement scheduling information of each of the floating factories 200 to 400. The movement scheduling information may include movement information of an individual floating factory for manufacturing an electronic product and transporting the manufactured electronic product to a designation. Here, the destination may be a demand location (or site or region) for the manufactured electronic product. For example, the manufacturing service device 100 may generate location information for a floating factory to move from a current location to a destination step by step. The generated movement scheduling information may be provided to the floating factory.

The floating factory that receives the movement scheduling information may collect components while moving between locations based on the movement scheduling information, and may transport an electronic product manufactured with the collected components to the destination.

The manufacturing service device 100 may be implemented with a server that transmits/receives information with the floating factories 200 to 400. In this case, as illustrated in FIG. 1, the manufacturing service device 100 may be implemented separately from the floating factories 200 to 400. However, the inventive concepts are not limited thereto. For example, the manufacturing service device 100 may be implemented with any electronic devices as long as such devices are capable of analyzing various information and transmitting/receiving information.

The server may include at least one memory configured to store computer-readable instructions, and one or more processors configured to execute the computer-readable instructions stored in the memory.

As described above, the manufacturing service device 100 may generate movement scheduling information of the floating factories 200 to 400, and may manufacture and transport an electronic product based on the movement scheduling information. As such, the integrated product management system 1000 may cope with a market situation that changes suddenly at various locations, and may supply an electronic product more efficiently. Further, because the floating factories 200 to 400 can manufacture electronic products while moving between locations, a time taken to supply the electronic product may be shortened. Accordingly, manufacturing costs of an electronic product may decrease.

The example embodiment illustrated in FIG. 1 shows that the integrated product management system 1000 includes the "n" floating factories 200 to 400, but the inventive concepts are not limited thereto. The integrated product management system 1000 may include one or more floating factories. Below, an operation of the integrated product management system 1000 will be more fully described with reference to the first floating factory 200. The description that is given with reference to the first floating factory 200 may also be applied to other floating factories.

Figure 2:
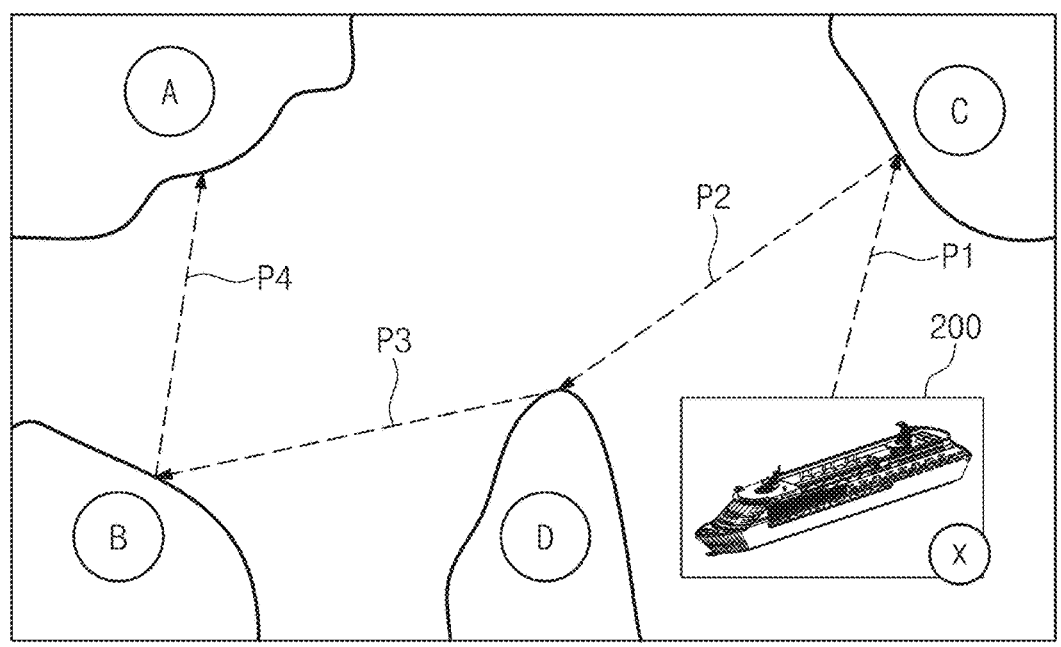
FIG. 2 is a diagram illustrating an example in which a floating factory of FIG. 1 moves.

FIG. 2 is a diagram illustrating an example in which a floating factory of FIG. 1 moves. Referring to FIG. 2, the floating factory 200 may be at location "X". The floating factory 200 may move along first to fourth paths P1 to P4 based on movement scheduling information received from the manufacturing service device 100. That is, the floating factory 200 may move from location "X" to location "C," location "D," location "B", and location "A" in the order of listed destinations.

For example, location "A" may be a destination where a supply of an electronic product is desired, and location "B," location "C," and location "D" may be locations where components of the electronic product are manufactured or can be procured. In this case, while moving to location "C," location "D," and location "B," the floating factory 200 may collect components and may assemble the components in compliance with an assembly process. While moving to the location "A," the floating factory 200 may assemble components to manufacture an electronic product. The floating factory 200 may supply the manufactured electronic product at location "A".

For example, to supply an SSD at location "A", the floating factory 200 may collect, for example, a flash memory, a memory controller, and a dynamic random access memory (DRAM) while moving to location "C," location "D," and location "B". In some example embodiments, the floating factory 200 may manufacture the SSD while moving between locations, after collecting the components.

Figure 3:
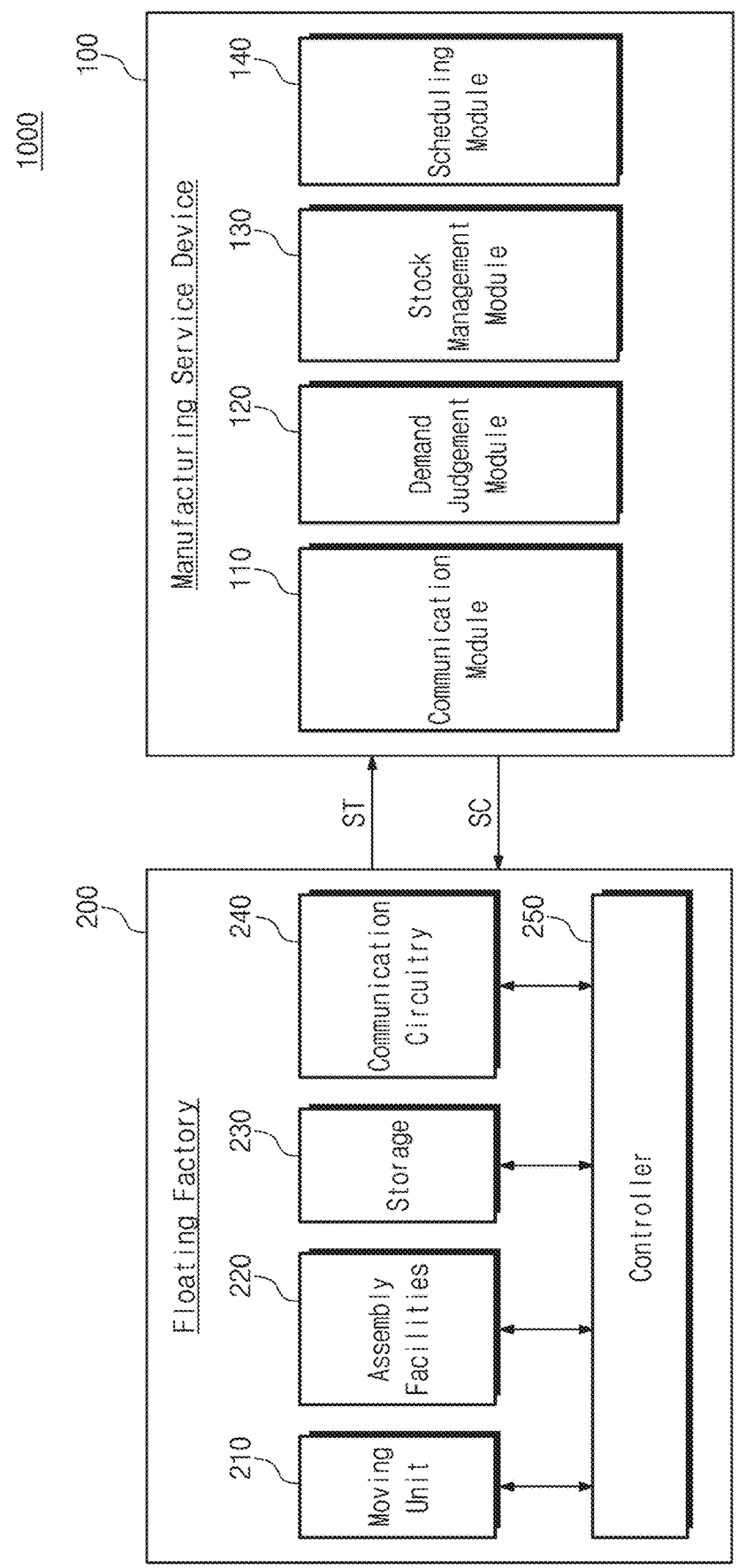
FIG. 3 is a detailed block diagram illustrating an integrated product management system according to an example embodiment of the inventive concepts.

FIG. 3 is a detailed block diagram illustrating an integrated product management system according to an example embodiment of the inventive concepts. Referring to FIG. 3, the integrated product management system 1000 may include the manufacturing service device 100 and the floating factory 200. The floating factory 200 may provide status information ST to the manufacturing service device 100. The status information ST may include various information about the floating factory 200. For example, the status information ST may include information, for example, a location of the floating factory 200, a list of assembleable electronic products, the quantity of electronic products and components kept in the floating factory 200, and/or a production amount per unit time.

The manufacturing service device 100 may generate movement scheduling information SC based on the status information ST, and may provide the movement scheduling information SC to the floating factory 200. The movement scheduling information SC may indicate a movement path of the floating factory 200 over time. The floating factory 200 may move to various locations based on the movement scheduling information SC.

The manufacturing service device 100 may include a communication module 110, a demand judgement module 120, a stock management module (or an inventory management module) 130, and a scheduling module 140. The communication module 110 may receive the status information ST from the floating factory 200 and may transmit the movement scheduling information SC to the floating factory 200. Further, the communication module 110 may communicate with various locations associated with manufacturing and supplying an electronic product. For example, the communication module 110 may receive information about a component from a factory that manufactures the component of the electronic product.

The demand judgement module 120 may judge demand for various electronic products at various locations. For example, the demand judgement module 120 may judge demand for a specific electronic device based on received orders for the specific electronic product or forecasted demand for the specific electronic product. For example, when an order for an SSD is received from location "A," the demand judgement module 120 may judge demand for the SSD at location "A". In some example embodiments, to forecast a demand, the demand judgement module 120 may store sales data indicating a sales trend of, for example, home appliances, according to location and time so that the demand judgement module 120 may forecast demand for home appliances based on the sales data. For example, the demand judgement module 120 may forecast demand for a TV at location "B" based on sales data associated with a sales trend of the TV at location "B" over time.

The stock management module 130 may manage the quantity of inventory of an electronic product and the quantity of inventory of components of the electronic product. For example, the stock management module 130 may manage the quantity of inventory of the electronic product and the quantity of inventory of the components of the electronic product according to locations where an electronic product and components are manufactured or supplied. For example, the stock management module 130 may manage the quantity of inventory of an SSD at location "A".

The scheduling module 140 may generate the movement scheduling information SC of the floating factory 200 for supplying the electronic product at a demand location (e.g., a destination). For example, the scheduling module 140 may select the floating factory 200 based on the demand information judged from the demand judgement module 120 and the status information ST of each of a plurality of floating factories, and may generate the movement scheduling information SC of the selected floating factory 200. For example, the demand information may include a demand location, a kind of an electronic product, a desired quantity, a desired deadline, etc. When the demand information is provided, the scheduling module 140 may calculate cost information based on the status information ST with regard to each of the plurality of floating factories. The scheduling module 140 may select one of the floating factories 200 to 400 that corresponds to the cost information indicating the lowest cost. For example, the cost information may include information on fuel consumption and inventory.

In an example embodiment, the scheduling module 140 may generate the movement scheduling information SC based on, for example, a location of the floating factory 200, desired components, locations where components are manufactured or procured, and/or a demand location. The scheduling module 140 may generate the movement scheduling information SC such that the floating factory 200 moves to various locations efficiently. In this case, the scheduling module 140 may in advance store information about locations where desired components are manufactured. The scheduling module 140 may store locations (e.g., components supply locations) where the desired components are manufactured. The stored locations may include first locations of a company running the integrated product management system 1000 as well as second locations of a third-party company.

In an example embodiment, the scheduling module 140 may generate the movement scheduling information SC in consideration of an assembly process of an electronic product. For example, the scheduling module 140 may generate the movement scheduling information SC such that components that are first used in the assembly process are collected first.

In an example embodiment, the scheduling module 140 may generate the movement scheduling information SC of the floating factory 200 in consideration of the quantity of inventory of components or the component quantity that the stock management module 130 manages. For example, the scheduling module 140 may generate the movement scheduling information SC such that the floating factory 200 moves to a location where the stock of components or components could be secured.

In an example embodiment, the scheduling module 140 may change the movement scheduling information SC according to a change of situation. For example, when a change in inventory or a problem in manufacturing components occurs, the scheduling module 140 may change the movement scheduling information SC. The changed movement scheduling information SC may be transmitted to the floating factory 200. The floating factory 200 may change a movement path in accordance with the changed movement scheduling information SC.

As described above, the manufacturing service device 100 may judge demand for an electronic product, and may select the floating factory 200 that is appropriate to manufacture and supply the electronic product with relative efficiency. The manufacturing service device 100 may generate the movement scheduling information SC of the floating factory 200 in consideration of various factors.

Each module of the manufacturing service device 100 may be implemented in the form of hardware, or a combination of hardware and software. For example, the software may be a machine code, firmware, an embedded code, and application software. For example, the hardware may include an electrical circuit, an electronic circuit, a processor, a computer, an integrated circuit, integrated circuit cores, a pressure sensor, a microelectromechanical system (MEMS), a passive element, or a combination thereof.

The various modules of the manufacturing service device 100 may be various functional units that perform various corresponding operations and/or functions. However, the various elements of the manufacturing service device 100 are not intended to be limited to the disclosed functional units. For example, the manufacturing service device 100 may include one or more additional function units that perform some additional operations and/or functions corresponding thereto.

According to some example embodiments, the various operations and/or functions corresponding to respective ones of the various functional units (e.g., the communication module 110, the demand judgement module 120, the stock management module 130, and the scheduling module 140) may be performed by other one or more of the functional units. Further, the manufacturing service device 100 may perform the operations and/or functions of the various functional units without sub-dividing the operations and/or functions of the manufacturing service device 100 into these various functional units.

For example, some of or an entirety of the various modules (e.g., the communication module 110, the demand judgement module 120, the stock management module 130, and the scheduling module 140) of the manufacturing service device 100 may be implemented with at least one memory or storage device configured to store computer-readable instructions and one or more processors configured to execute the computer-readable instructions stored in the memory such that the one or more processors are configured to perform the various operations and/or functions corresponding to the various modules of the manufacturing service device 100.

The floating factory 200 may include a moving unit 210, assembly facilities 220, a storage 230, communication circuitry 240, and a controller 250. The moving unit 210 may move the floating factory 200 to various locations. For example, the moving unit 210 may move the floating factory 200 to locations where components are manufactured or a demand location of an electronic product under control of the controller 250.

The assembly facilities 220 may assemble components to manufacture an electronic product. The assembly facilities 220 may assemble components under control of the controller 250. The assembly facilities 220 may include facilities capable of manufacturing one or more electronic products. For example, the assembly facilities 220 may include facilities capable of manufacturing an SSD, a memory controller, a mobile phone, a TV, etc.

The assembly facilities 220 may be implemented to be easily mounted on the floating factory 200 and/or to be easily separated from the floating factory 200. In this case, the assembly facilities 220 may be separated from the floating factory 200 and may be moved to a factory on land or any other floating factory. That is, the assembly facilities 220 to be mounted on the floating factory 200 may have a different configuration according to a kind of an electronic product targeted for manufacturing.

The storage 230 may store components of an electronic product and the electronic product. For example, the storage 230 may store components provided from locations where the components are manufactured or procured or may store an electronic product manufactured by using the components. Information about components and an electronic product stored in the storage 230 may be provided to the controller 250. The controller 250 may transmit the provided information to the communication circuitry 240.

The communication circuitry 240 may transmit the status information ST of the floating factory 200 to the manufacturing service device 100, and may receive the movement scheduling information SC from the manufacturing service device 100.

The controller 250 may control an operation of each constituent element of the floating factory 200. For example, when the movement scheduling information SC is received from the manufacturing service device 100, the controller 250 may control the moving unit 210. As such, the floating factory 200 may move to various locations in a given order. When components are collected from various locations, the controller 250 may control the assembly facilities 220 in compliance with an assembly process. As such, the assembly facilities 220 may assemble components to manufacture an electronic product. The manufactured electronic product may be stored in the storage 230.

According to some example embodiments, the controller 250 alone or in combination with the communication circuitry 240 may be implemented by at least one memory or storage device configured to store computer-readable instructions and one or more processors configured to execute the computer-readable instructions stored in the memory such that the one or more processors are configured to cause the moving unit 210, the assembly facilities 220, the storage 230, and/or the communication circuitry 240 to execute the various operations and/or functions corresponding thereto.

Below, an operation of the manufacturing service device 100 will be more fully described with reference to FIGS. 4 to 8.

Figure 4:
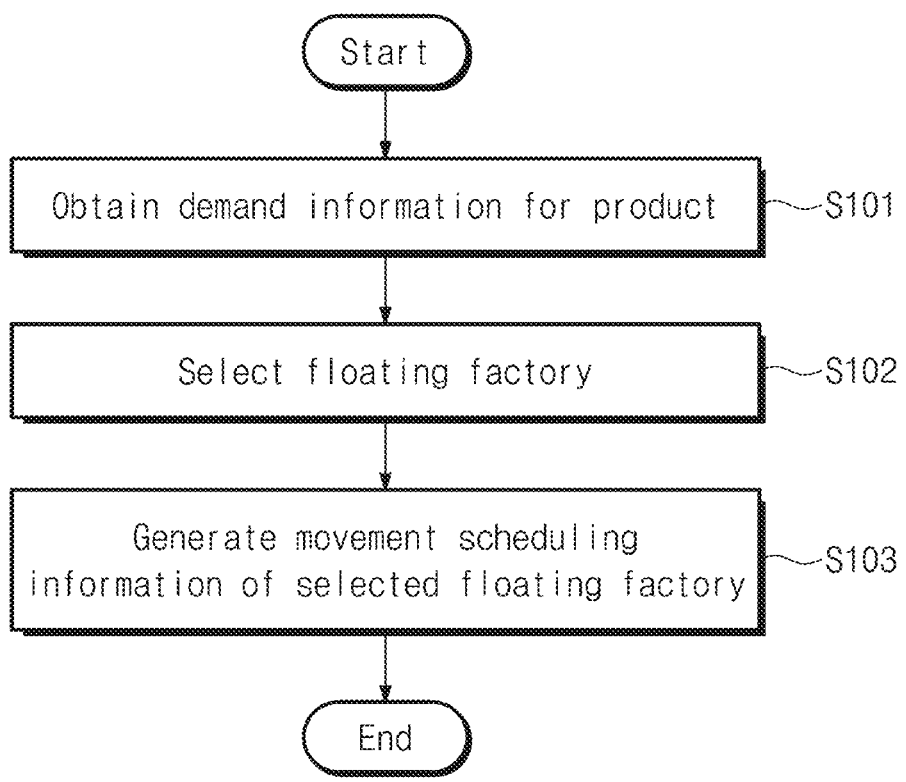
FIG. 4 is a flowchart illustrating an example of an operation of a manufacturing service device of FIG. 3.

FIG. 4 is a flowchart illustrating an example of an operation of a manufacturing service device of FIG. 3. Referring to FIG. 4, in operation S101, the manufacturing service device 100 may obtain demand information for an electronic product. The manufacturing service device 100 may obtain the demand information based on received orders for an electronic product or a forecasted demand for the electronic product.

In operation S102, the manufacturing service device 100 may select one (e.g., the floating factory 200) of the plurality of floating factories 200 to 400 based on the obtained demand information. For example, the manufacturing service device 100 may calculate cost information based on the status information ST of each of the plurality of floating factories 200 to 400. The manufacturing service device 100 may select the floating factory 200 that corresponds to the calculated cost information indicating the lowest cost. That is, the floating factory 200 may be selected to manufacture and supply a desired electronic product. For example, when the demand information including a kind of the desired electronic product, a desired quantity, and a desired deadline is obtained, the manufacturing service device 100 may calculate cost information based on an electronic product that floating factories are able to manufacture, a production amount per unit time, and the quantity of inventory of the components of the electronic device and/or the quantity of inventory of the electronic product. The manufacturing service device 100 may select the floating factory 200 corresponding to the lowest cost.

In operation S103, the manufacturing service device 100 may generate the movement scheduling information SC of the selected floating factory, for example, the floating factory 200. The manufacturing service device 100 may generate the movement scheduling information SC based on various information (e.g., desired components of the request electronic product, component locations, a location of the floating factory 200, an assembly process, and a stock status of the desired electronic product).

Figure 5:
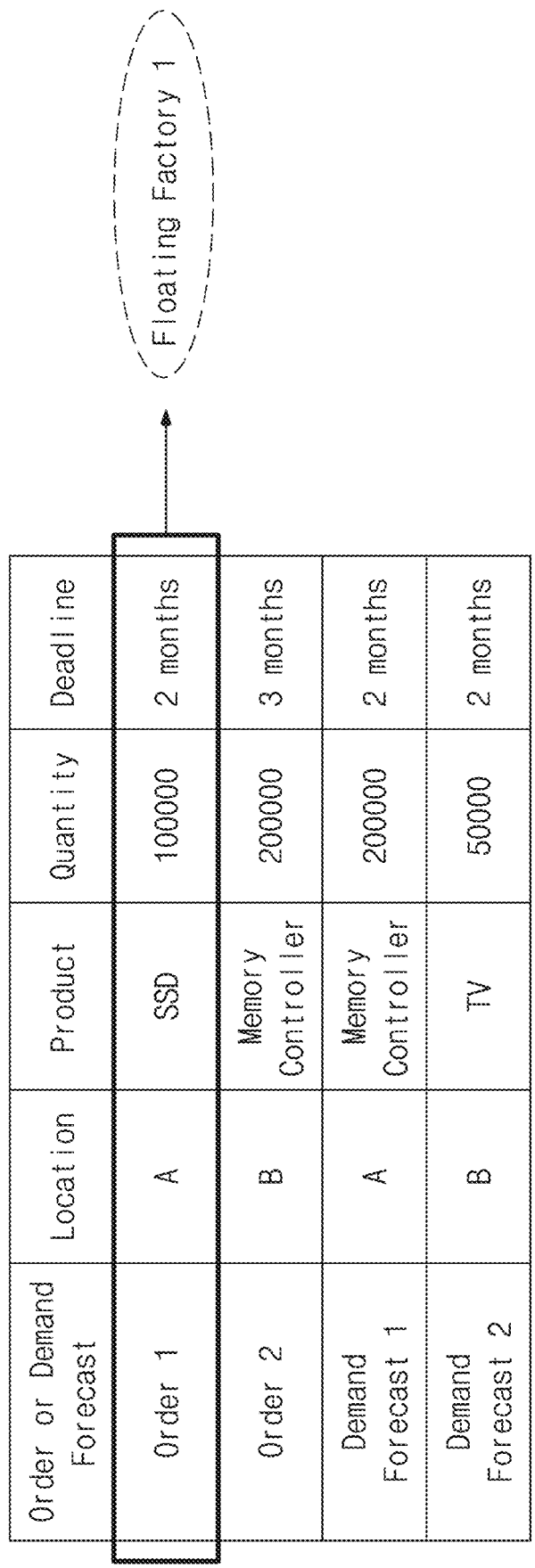
FIG. 5 illustrates an example in which a manufacturing service device of FIG. 3 obtains demand information and selects a floating factory.

FIG. 5 illustrates an example in which a manufacturing service device of FIG. 3 obtains demand information and selects a floating factory. Referring to FIGS. 3 and 5, the manufacturing service device 100 may obtain demand information based on received orders or demand forecasts. As illustrated in FIG. 5, the manufacturing service device 100 may receive a first order and a second order and may perform a first demand forecast and a second demand forecast. In this case, the first order may be an order for 100,000 SSDs after two months at location "A", and the second order may be an order for 200,000 memory controllers after three months at location "B". The first demand forecast may be a demand forecast for 200,000 memory controllers after two months at location "A", and the second demand forecast may be a demand forecast for 50,000 TVs after two months at location "B".

In response to the first order, the manufacturing service device 100 may select the floating factory 200 that may manufacture the SSDs and may supply the SSDs to location "A". The manufacturing service device 100 may select the first floating factory 200, which may be equipped with SSD assembly facilities and may manufacture 100,000 SSDs within two months, from among a plurality of floating factories. In this case, the first floating factory 200 may be a floating factory that may supply the SSDs with the lowest cost among the plurality of floating factories. As described above, the manufacturing service device 100 may select the floating factory 200 based on an assembly facilities and productivity of the floating factory 200.

Figure 6:
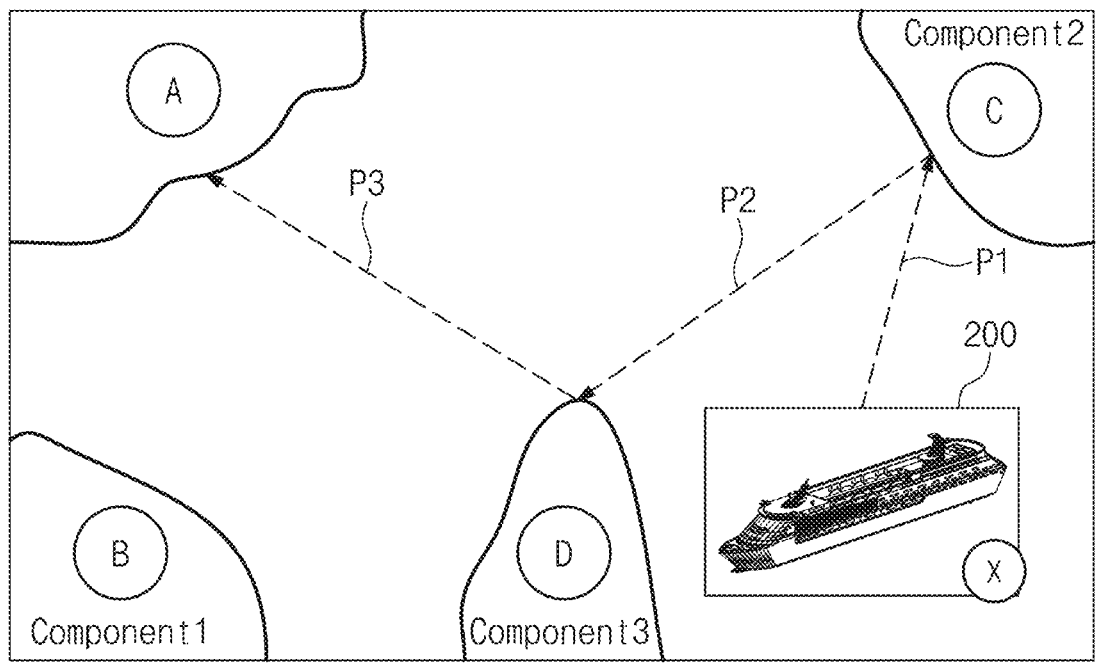
FIG. 6 illustrates an example in which a manufacturing service device of FIG. 3 generates movement scheduling information.

FIG. 6 illustrates an example in which the manufacturing service device 100 of FIG. 3 generates movement scheduling information. Referring to FIGS. 3 and 6, the manufacturing service device 100 may generate the movement scheduling information SC that is desirable for the selected floating factory 200 to manufacture and supply an electronic product. The manufacturing service device 100 may generate the movement scheduling information SC based on a demand location of an electronic product, components of the electronic product, locations of the components, and a location of the floating factory 200.

When demand for an electronic product including a second component and a third component is at location "A," the manufacturing service device 100 may generate the movement scheduling information SC based on location "C" where the second component is manufactured, location "D" where the third component is manufactured, location "X" of the floating factory 200, and a demand location "A" of the electronic product. In this case, the manufacturing service device 100 may generate the movement scheduling information SC including first to third paths P1 to P3.

The floating factory 200 may move along the first path P1 based on the movement scheduling information SC, and may obtain the second component at location "C." Afterwards, the floating factory 200 may move along the second path P2, and may obtain the third component at location "D." For example, while moving along the third path P3, the floating factory 200 may assemble the second and third components to manufacture the electronic product. After arriving at location "A," the floating factory 200 may supply the manufactured electronic product.

As described with reference to FIG. 6, when the movement scheduling information SC is generated based on a demand location of an electronic product, locations of components, and a location of the floating factory 200, the floating factory 200 may move a reduced or minimum distance to obtain components, and may assemble the obtained components to manufacture the electronic product. Accordingly, a time taken to manufacture and supply an electronic product may be shortened through the floating factory 200.

Figure 7:
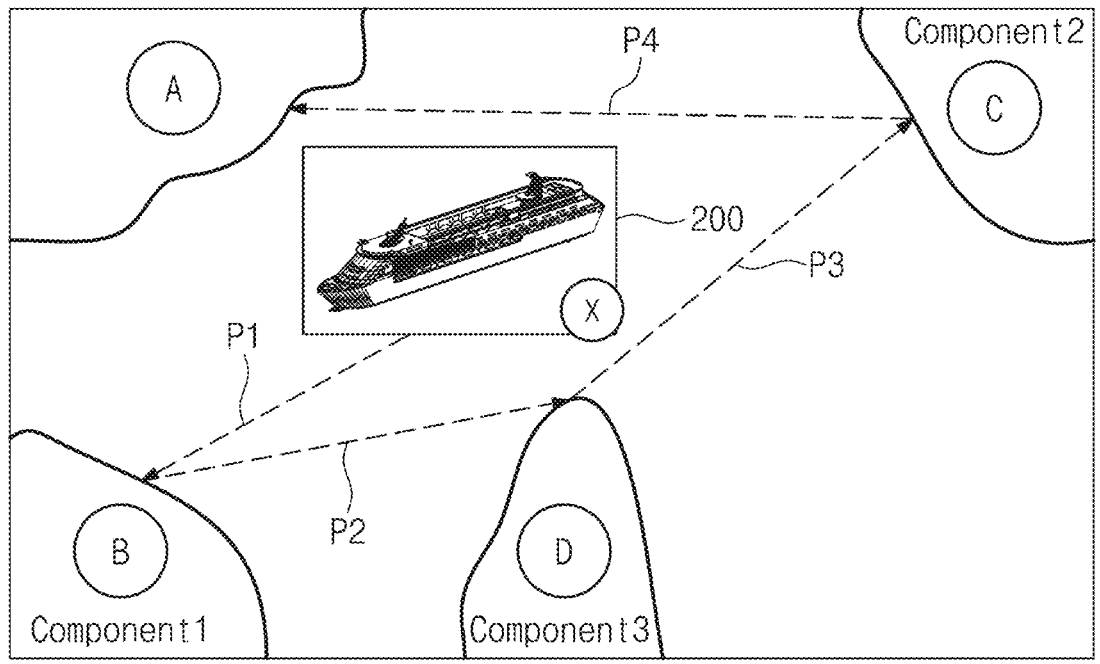
FIG. 7 illustrates another example in which a manufacturing service device of FIG. 3 generates movement scheduling information.

FIG. 7 illustrates another example in which the manufacturing service device 100 of FIG. 3 generates movement scheduling information. Referring to FIGS. 3 and 7, the manufacturing service device 100 may generate the movement scheduling information SC that is desired for the selected floating factory 200 to manufacture and supply an electronic product. The manufacturing service device 100 may generate the movement scheduling information SC based on a demand location of an electronic product, components of the electronic product, locations of the components, an assembly process, and a location of the floating factory 200.

When demand for an electronic product that is desired to be assembled to include components in order of a first component, a third component, and a second component is at location "A," the manufacturing service device 100 may generate the movement scheduling information SC based on the demand location "A," location "B" where the first component is manufactured, location "C" where the second component is manufactured, location "D" where the third component is manufactured, location "X" of the floating factory 200. In this case, the manufacturing service device 100 may generate the movement scheduling information SC including first to fourth paths P1 to P4.

The floating factory 200 may move along the first path P1 based on the movement scheduling information SC, and may obtain the first component at location "B." Afterwards, the floating factory 200 may move along the second path P2, and may obtain the third component at location "D." Afterwards, while moving along the third path P3, the floating factory 200 may assemble the first and third components to manufacture an intermediate product. The floating factory 200 may obtain the second component at location "C." While moving along the fourth path P4, the floating factory 200 may assemble the intermediate product with the second component in compliance with an assembly process to manufacture the electronic product. After arriving at location "A," the floating factory 200 may supply the manufactured electronic product.

As described with reference to FIG. 7, in the case of collecting components in compliance with an assembly process, the floating factory 200 may manufacture an intermediate product while moving to a different location to obtain another component. Accordingly, a time taken to manufacture and supply an electronic product may be further shortened.

Figure 8:
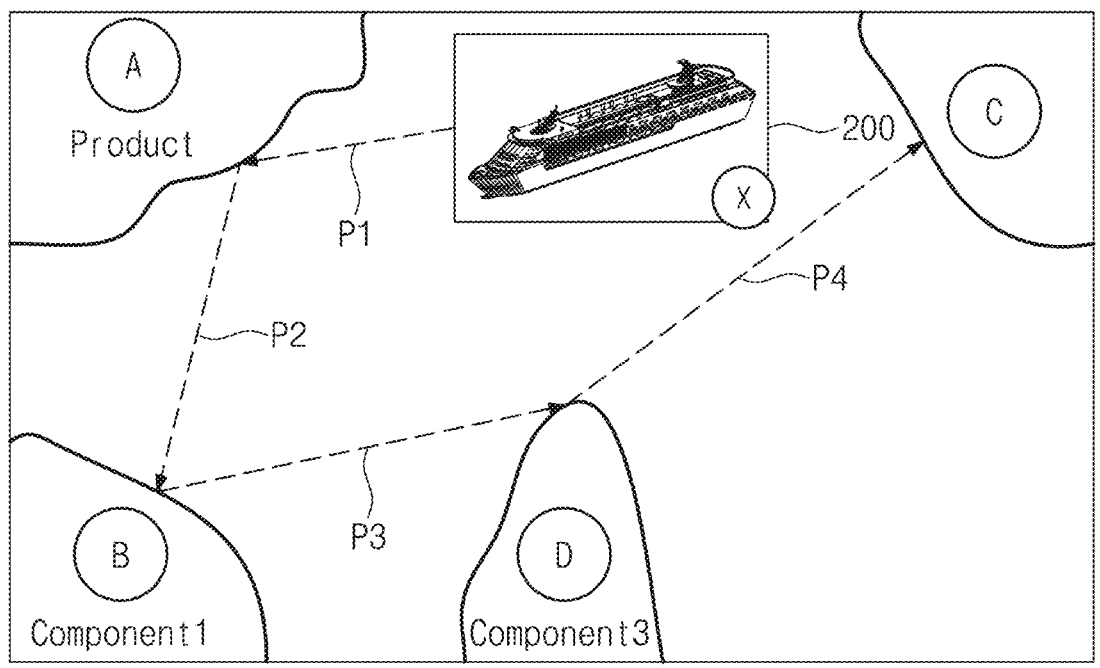
FIG. 8 illustrates another example in which a manufacturing service device of FIG. 3 generates movement scheduling information.

FIG. 8 illustrates another example in which the manufacturing service device 100 of FIG. 3 generates movement scheduling information. Referring to FIGS. 3 and 8, the manufacturing service device 100 may generate the movement scheduling information SC that is desired for the selected floating factory 200 to manufacture and supply an electronic product. The manufacturing service device 100 may generate the movement scheduling information SC based on a demand location of an electronic product, components of the electronic product, locations of the components, a stock location of the electronic product, and a location of the floating factory 200.

When demand for an electronic product including a first component and a third component is at location "C", the manufacturing service device 100 may generate the movement scheduling information SC based on the demand location "C," location "B" where the first component is manufactured or procured, location "D" where the third component is manufactured or procured, the stock location "A" of the electronic product, and location "X" of the floating factory 200. When the quantity in stock at the stock location is greater than the quantity of demand, the movement scheduling information SC may be generated only based on the stock location "A" and the demand location "C". When the quantity in stock is smaller than the quantity of demand, the manufacturing service device 100 may generate the movement scheduling information SC including first to fourth paths P1 to P4.

The floating factory 200 may move along the first path P1 based on the movement scheduling information SC, and may obtain a stock of the electronic product at location "A." Afterwards, the floating factory 200 may move along the second path P2 and may obtain the first component at location "B." Afterwards, the floating factory 200 may move along the third path P3, and may obtain the third component at location "D." While moving along the fourth path P4, the floating factory 200 may assemble the first and third components to manufacture the electronic product. After arriving at location "C," the floating factory 200 may supply the stock of the electronic product obtained from the location "A" and the manufactured electronic products.

As described with reference to FIG. 8, when there is a location where the stock of the electronic product is present, the movement scheduling information SC may be generated based on a location of the stock. In this case, the stock present at the location may be transported to a demand location of an electronic product. Accordingly, the stock of the electronic product may be efficiently managed, and the integrated product management system 1000 may efficiently cope with a demand that changes suddenly.

Figure 9:
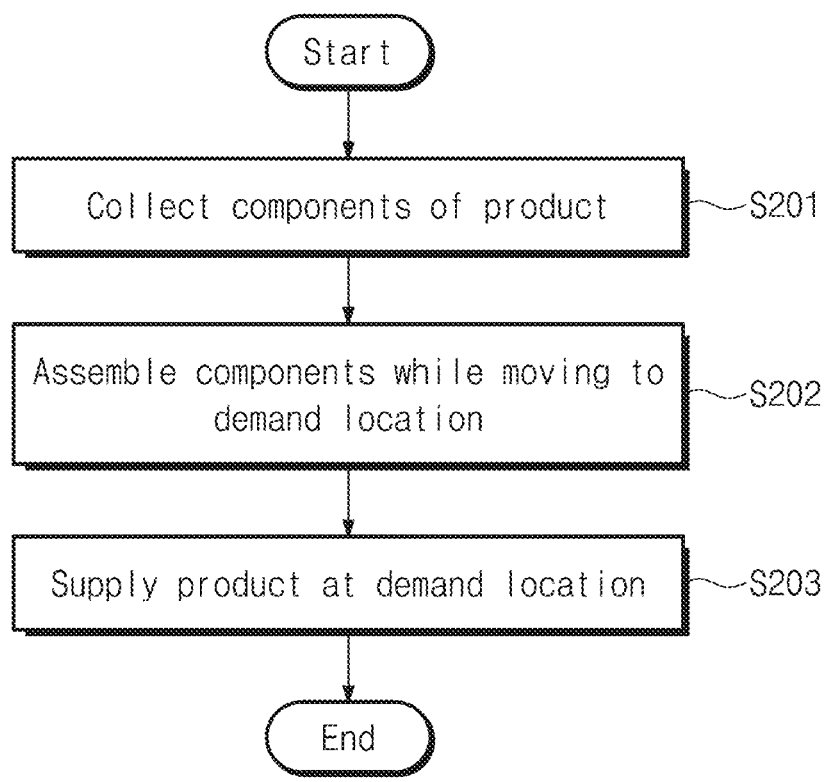
FIG. 9 is a flowchart illustrating an example of an operation of a floating factory of FIG. 3.

FIG. 9 is a flowchart illustrating an example of an operation of the floating factory 200 of FIG. 3. Referring to FIGS. 3 and 9, in operation S201, the floating factory 200 may collect components of an electronic product. The floating factory 200 may collect components while moving to locations of the movement scheduling information SC provided from the manufacturing service device 100. In an example embodiment, the floating factory 200 may manufacture an intermediate product by assembling some components in compliance with an assembly process while collecting components and moving between the locations.

In operation S202, the floating factory 200 may assemble the collected components while moving to a demand location. The floating factory 200 may move to the demand location, based on the movement scheduling information SC received from the manufacturing service device 100. The floating factory 200 may assemble components to manufacture an electronic product.

In an example embodiment, the floating factory 200 may test or inspect the manufactured electronic product. The floating factory 200 may classify a defect-free product (or alternatively, a product having defects less than a threshold number) through the test. The floating factory 200 may package a product passing the test and supply the electronic product passing the test.

In operation S203, the floating factory 200 may supply the electronic product at the demand location. In an example embodiment, the floating factory 200 may supply the stock collected while moving to a demand location, as well as an electronic product manufactured while moving to the demand location.

Figure 10:
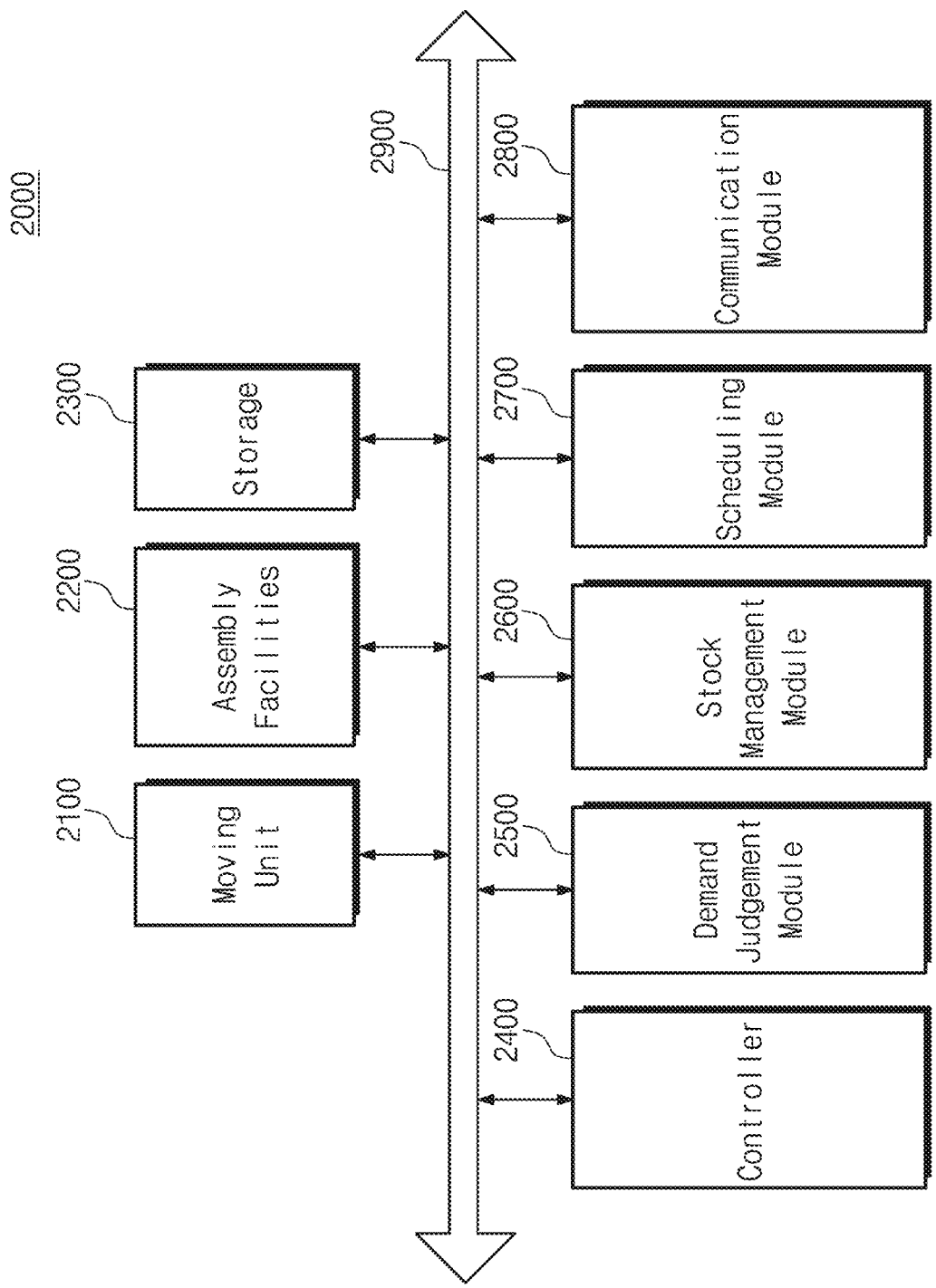
FIG. 10 is a block diagram illustrating an integrated product management system according to an example embodiment of the inventive concepts.

FIG. 10 is a block diagram illustrating an integrated product management system according to an example embodiment of the inventive concepts. Referring to FIG. 10, an integrated product management system 2000 may include a moving unit 2100, assembly facilities 2200, a storage 2300, a controller 2400, a demand judgement module 2500, a stock management module 2600, a scheduling module 2700, a communication module 2800, and a bus 2900.

Operations of the moving unit 2100, the assembly facilities 2200, the storage 2300, and the controller 2400 may be the same as or substantially similar to the operations of the moving unit 210, the assembly facilities 220, the storage 230, and the controller 250 of FIG. 3. Operations of the demand judgement module 2500, the stock management module 2600, and the scheduling module 2700 may be the same as or substantially similar to the operations of the demand judgement module 120, the stock management module 130, and the scheduling module 140 of FIG. 3. Below, a description will be focused on a difference between the integrated product management system 1000 of FIG. 3 and the integrated product management system 2000 of FIG. 10.

The integrated product management system 2000 may include all the functions of the manufacturing service device 100 and the floating factory 200 of FIG. 3. For example, the integrated product management system 2000 may include the functions of the manufacturing service device 100 and may be implemented to be movable like the floating factory 200. The integrated product management system 2000 may generate the movement scheduling information SC through the scheduling module 2700, and may move based on the generated movement scheduling information SC. While moving, the integrated product management system 2000 may manufacture an electronic product, and may supply the electronic product at a destination.

The controller 2400 may control constituent elements of the integrated product management system 2000. The controller 2400 may control, for example, the demand judgement module 2500, the stock management module 2600, the scheduling module 2700, and the communication module 2800, as well as the moving unit 2100, the assembly facilities 2200, and the storage 2300. Under control of the controller 2400, the demand judgement module 2500 may judge demand for an electronic product, and the stock management module 2600 may manage stock and component information at various locations. Further, under control of the controller 2400, the scheduling module 2700 may generate the movement scheduling information SC. The controller 2400 may control the moving unit 2100, the assembly facilities 2200, and the storage 2300 based on the generated movement scheduling information SC.

The communication module 2800 may transmit a signal generated in the integrated product management system 2000 to the outside or may receive a signal from the outside. For example, the integrated product management system 2000 may communicate with any other integrated product management system through the communication module 2800.

The bus 2900 may provide a communication path between the constituent elements of the integrated product management system 2000. For example, through the bus 2900, the controller 2400 may transmit a signal to each constituent element or may receive a signal from each constituent element.

The various modules of the integrated product management system 2000 may be various functional units that perform various corresponding operations and/or functions. However, the various elements of the integrated product management system 2000 are not intended to be limited to the disclosed functional units. For example, the integrated product management system 2000 may include one or more additional function units that perform some additional operations and/or functions corresponding thereto.

According to some example embodiments, the controller 2400 alone or in combination of one or more of the demand judgment module 2500, the stock management module 2600, the scheduling module 2700, or the communication module 2800 may be implemented by at least one memory or storage device configured to store computer-readable instructions and one or more processors configured to execute the computer-readable instructions stored in the memory such that the one or more processors are configured to cause the moving unit 2100, the assembly facilities 2200, the storage 2300, and/or the communication module 2800 to execute the various operations and/or functions corresponding thereto.

The at least one memory described in this disclosure may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The at least one memory may be configured to store computer programs, program code, computer-readable instructions, or some combination thereof, for one or more operating systems and/or for implementing the example embodiments described herein. The computer programs, program code, computer-readable instructions, or some combination thereof, may also be loaded from a separate computer readable storage medium into the memory or and/or the one or more processors using a drive mechanism. Such separate computer readable storage medium may include a Universal Serial Bus (USB) flash drive, a memory stick, a Blu-ray/DVD/CD-ROM drive, a memory card, and/or other like. The computer programs, program code, computer-readable instructions, or some combination thereof, may be loaded into the memory or and/or the one or more processors from a remote data storage device via a network interface, rather than via a local computer readable storage medium. Additionally, the computer programs, program code, computer-readable instructions, or some combination thereof, may be loaded into the one or more storage devices and/or the one or more processors from a remote computing system that is configured to transfer and/or distribute the computer programs, program code, computer-readable instructions, or some combination thereof, over a network. The remote computing system may transfer and/or distribute the computer programs, program code, computer-readable instructions, or some combination thereof, via a wired interface, an air interface, and/or any other like medium.

The one or more processors described in this disclosure may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Example embodiments of inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain.

According to the inventive concepts, while moving along an optimum path based on movement scheduling information generated in consideration of various factors, a floating factory may manufacture an electronic product, and may supply the manufacture electronic product at a destination. Accordingly, a time taken to supply the electronic product may be shortened, and/or manufacturing costs of the electronic product may decrease.

Further, an electronic product may be efficiently supplied by coping with a market situation changing suddenly at various locations.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. An operating method of a manufacturing service device for managing a floating factory, the method comprising:
obtaining demand information on an electronic product at a demand location;
calculating cost information of at least one floating factory of a plurality of floating factories based on the demand information and status information of each of the plurality of floating factories;
selecting a specific floating factory from the plurality of floating factories corresponding to the calculated cost information indicating a lowest cost;
generating movement scheduling information of the specific floating factory based on the demand location and manufacturing locations of components of the electronic product;
transmitting the movement scheduling information to the specific floating factory;
configuring the specific floating factory to manufacture the electronic product and test the electronic product for defects based on the movement scheduling information, while moving to the demand location; and
supplying the electronic product that has passed the test at the demand location,
wherein the status information includes a location of each of the plurality of floating factories, whether each pf the plurality of floating factories is capable of manufacturing the electronic product, a quantity of the electronic product and the components stored in each of the plurality of floating factories, and a production amount per unit time of each of the plurality of floating factories.

2. The method of claim 1, wherein the obtaining includes receiving an order for the electronic product.

3. The method of claim 1, wherein the obtaining includes forecasting the demand information of the demand location based on sales data of the electronic product according to location and time.

4. The method of claim 1, wherein the generating includes generating the movement scheduling information additionally in consideration of an assembly process of the electronic product.

5. The method of claim 1, further comprising:
managing stock information of the electronic product according to manufacture or supply locations of the electronic product.

6. The method of claim 5, wherein the generating includes generating the movement scheduling information additionally in consideration of the stock information.

7. The method of claim 1, wherein the specific floating factory is a ship.

8. An integrated product management system comprising:
a server configured to generate movement scheduling information based on a demand location of an electronic product and manufacturing locations of components of the electronic product; and
a floating factory configured to,
move to the manufacturing locations of the components of the electronic product based on the movement scheduling information to collect the components of the electronic product, and
assemble the collected components to manufacture the electronic product, while moving to the demand location,
wherein the server includes,
at least one memory configured to store computer-readable instructions, and
one or more processors configured to execute the computer-readable instructions such that the server is configured to,
obtain demand information of the demand location for the electronic product,
select the floating factory, from among a plurality of floating factories, based on the demand information and status information of each of the plurality of floating factories, and
generate the movement scheduling information of the selected floating factory, and
wherein the status information includes a location of each of the plurality of floating factories, whether each of the plurality of floating factories is capable of manufacturing the electronic product, a quantity of the electronic product and the components stored in each of the plurality of floating factories, and a production amount per unit time of each of the plurality of floating factories.

9. The integrated product management system of claim 8, wherein the floating factory is further configured to,
move to the demand location based on the movement scheduling information; and
store the collected components and the manufactured electronic product.

10. The integrated product management system of claim 9, wherein the floating factory is further configured to transmit the status information of the floating factory to the server.

11. The integrated product management system of claim 8, wherein the one or more processors are configured to forecast the demand information of the demand location based on sales data of the electronic product according to location and time.

12. The integrated product management system of claim 8, wherein the one or more processors are further configured to generate the movement scheduling information additionally in consideration of an assembly process of the electronic product.

13. The integrated product management system of claim 8, wherein the one or more processors are further configured to manage stock information of the electronic product with regard to each of locations where the electronic product is manufactured or supplied.

14. The integrated product management system of claim 13, wherein the one or more processors are further configured to generate the movement scheduling information additionally in consideration of the stock information.

15. A floating factory apparatus comprising:
at least one memory configured to store computer-readable instructions; and
one or more processors configured to execute the computer-readable instructions such that the one or more processors are configured to,
obtain demand information of a demand location for an electronic product,
generate movement scheduling information based on manufacturing locations of components of the electronic product and the demand location, select the floating factory, from among a plurality of floating factories, based on the demand information and status information of each of the plurality of floating factories,
cause the floating factory to move to the manufacturing locations of the components of the electronic product and to the demand location based on the movement scheduling information, and
cause the floating factory to assemble the components collected from the manufacturing locations to manufacture the electronic product, while moving to the demand location,
wherein the status information includes a location of each of the plurality of floating factories, whether each of the plurality of floating factories is capable of manufacturing the electronic product, a quantity of the electronic product and the components stored in each of the plurality of floating factories, and a production amount per unit time of each pf the plurality of floating factories.

16. The floating factory of claim 15, wherein the one or more processors are further configured to forecast the demand information of the demand location based on sales data of the electronic product according to location and time.

17. The floating factory of claim 15, wherein the one or more processors are further configured to generate the movement scheduling information in consideration of at least one of a location of the floating factory or an assembly process of the electronic product.

\* \* \* \* \*